US009626872B2

(12) United States Patent
Judd et al.

(10) Patent No.: US 9,626,872 B2
(45) Date of Patent: Apr. 18, 2017

(54) ENHANCED FLIGHT CREW DISPLAY FOR SUPPORTING MULTIPLE CONTROLLER/PILOT DATA LINK COMMUNICATIONS (CPDLC) VERSIONS

(75) Inventors: Thomas D. Judd, Woodinville, WA (US); Michael J. Kayser, Peoria, AZ (US); Thomas F. McGuffin, Bellevue, WA (US); Reetu Gupta, Redmond, WA (US)

(73) Assignee: Honeywell International Inc., Morris Plains, NJ (US)

( * ) Notice: Subject to any disclaimer, the term of this patent is extended or adjusted under 35 U.S.C. 154(b) by 640 days.

(21) Appl. No.: 12/771,146

(22) Filed: Apr. 30, 2010

(65) Prior Publication Data

US 2011/0270992 A1 Nov. 3, 2011

(51) Int. Cl.
*G06F 15/173* (2006.01)
*G08G 5/00* (2006.01)

(52) U.S. Cl.
CPC ......... *G08G 5/0021* (2013.01); *G08G 5/0013* (2013.01)

(58) Field of Classification Search
None
See application file for complete search history.

(56) References Cited

U.S. PATENT DOCUMENTS

| | | | | |
|---|---|---|---|---|
| 7,495,602 | B2 | 2/2009 | Sandell et al. | |
| 8,220,042 | B2 * | 7/2012 | Hagiu et al. | 726/14 |
| 2007/0129854 | A1 | 6/2007 | Sandell et al. | |
| 2009/0089693 | A1 | 4/2009 | Fahy | |

OTHER PUBLICATIONS

Mirriam-Webster online dictionary (m-w.com), “preference”.*
Mirriam-Webster online dictionary (m-w.com), “log on”.*
“2.3.6 Communication Requirements”, “Manual of Technical Provisions for the Aeronautical Telecommunications network (ATN)”, Aug. 2006, pp. 128-205, Publisher: ICAO.
“2.3 Controller Pilot Data Link Communication Application”, “Manual of Technical Provisions for the Aeronautical Telecommunication Network (ATN)”, Aug. 2006, pp. 119, Publisher: ICAO.
“2.3.4 Formal Definitions of Messages”, “Manual of Technical Provisions for the Aeronautical Telecommunication Network (ATN)”, Aug. 2006, p. 19, Publisher: ICAO.
“2.3.5 Protocol Definition”, “Manual of Technical Provisions for the Aeronautical Telecommunication Network (ATN)”, Aug. 2006, pp. 73-127, vol. 4, Publisher: ICAO.
“Interoperability Requirements Standard for Aeronautical Telecommunications Network Baseline 1”, “RTCA DO-280B”, Jun. 26, 2007, pp. 1219, vol. 1, No. 1-4, Publisher: RTCA.

(Continued)

*Primary Examiner* — Scott B Christensen
(74) *Attorney, Agent, or Firm* — Fogg & Powers LLC

(57) ABSTRACT

An avionics system comprising a human machine interface configured to display a user interface and a control device is provided. The control device coupled to the human machine interface, wherein the control device is configured to send and receive controller/pilot data link communications (CPDLC) messages and adjust the user interface based on a first CPDLC version of an established first CPDLC session.

20 Claims, 4 Drawing Sheets

(56) References Cited

OTHER PUBLICATIONS

European Patent Office, "Communication under Rule 71(3) EPC", "from Foreign Counterpart of U.S. Appl. No. 12/771,146", Nov. 15, 2012, pp. 18, Published in: EP.

"PM-CPDLC Validation Report", Apr. 29, 2005, pp. 1-12, Publisher: Aeronautical Communications Panel—Working Group N.

Signore et al., "The Aeronautical Telecommunication Network (ATN)", "Military Communications Conference", Oct. 18, 1998, pp. 40-44, vol. 1, Publisher: IEEE.

European Patent Office, "Communication pursuant to Article 94(3) EPC from EP Application No. 11163308.7, mailes Aug. 19, 2011", "from Foreign Counterpart of U.S. Appl. No. 12/771,146", pp. 1-6, Published in: EP European Patent Office, "European Extended Search Report from from EP Application No. 1163306.7, mailed Aug. 9, 2011", "from Foreign Counterpart of U.S. Appl. No. 12/771,146", Aug. 9, 2011, pp. 1-5, Published in: EP.

European Patent Office, "Communication pursuant to Article 94(3) EPC, from EP Application No. 11163308.7, mailed Jan. 27, 2012", "from Foreign Counterpart of U.S. Appl. No. 12/771,146", Jan. 27, 2012, pp 1-5.

* cited by examiner

ENHANCED FLIGHT CREW DISPLAY FOR SUPPORTING MULTIPLE CONTROLLER/PILOT DATA LINK COMMUNICATIONS (CPDLC) VERSIONS

BACKGROUND

Controller/Pilot Data Link Communications (CPDLC) are typically utilized by a flight crew member for exchanging air traffic control information with an air traffic control (ATC) center. Each ATC center is part of an airspace that follows a standard defining which CPDLC version is supported in that airspace. Different CPDLC versions support different sets of CPDLC messages. Access to the CPDLC is provided through a human machine interface (HMI). Typical peer ground CPDLC applications have a unique CPDLC version that each ATC center supports. Furthermore, which messages are supported and which messages are unsupported in that airspace or by that ATC center may not be clear to the crew members. Presently, when an aircraft enters into a particular airspace, the crew member needs to log into that airspace's air traffic control system, and it is not always known which message set version a particular ATC center supports. This introduces a point of confusion for the crew members because as they connect to various ATC centers with different CPDLC versions supported, they have to know the associated CPDLC version and select the correct messages that correspond with that CPDLC version.

SUMMARY

One embodiment is directed to an avionics system comprising a human machine interface and a control device. The human machine interface is configured to display a user interface. The control device coupled to the human machine interface, wherein the control device is configured to send and receive controller/pilot data link communications (CPDLC) messages and adjust the user interface based on a first CPDLC version of an established first CPDLC session.

DRAWINGS

Like reference numbers and designations in the various drawings indicate like elements.

DETAILED DESCRIPTION

Figure 1:
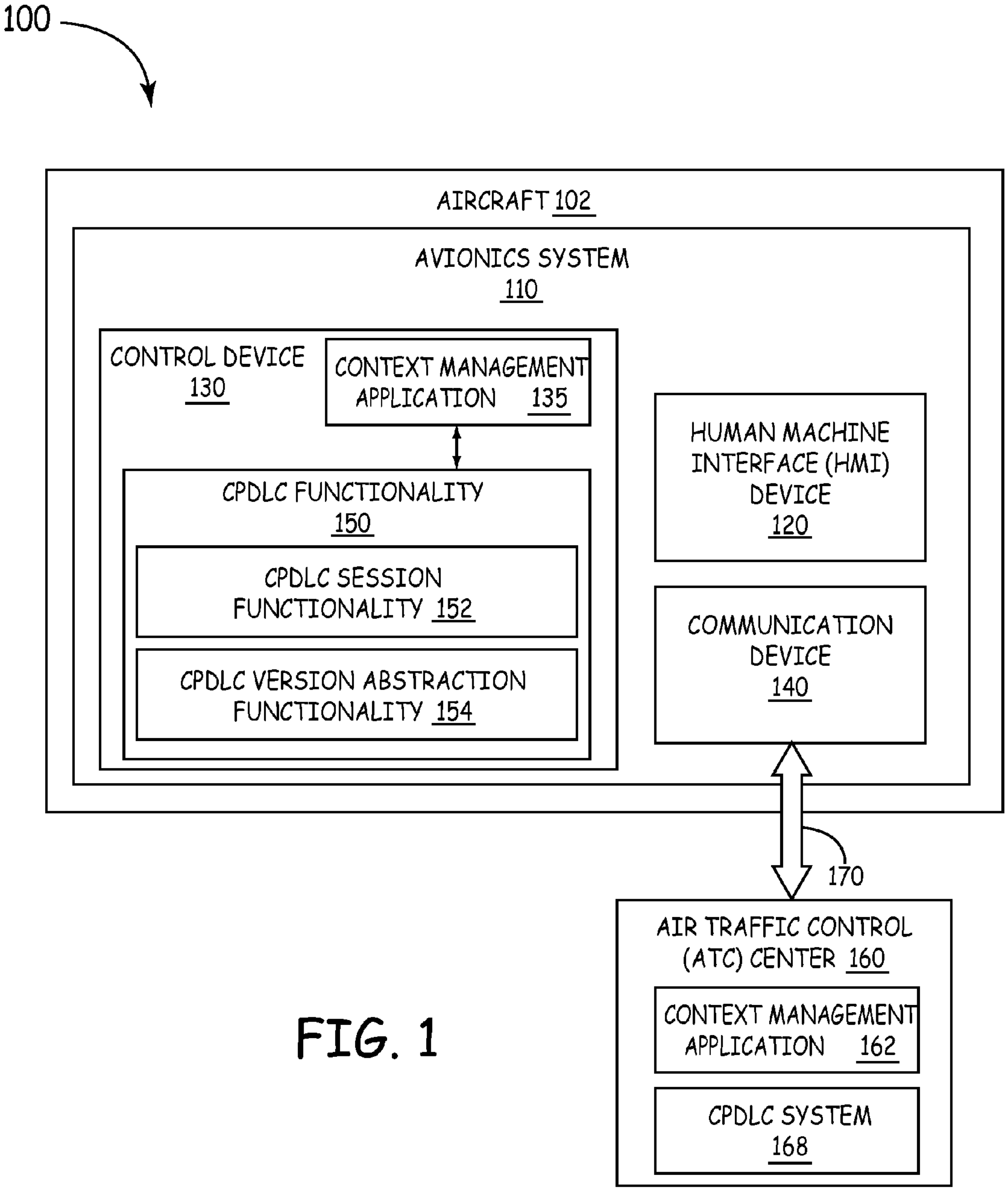
FIG. 1 is a block diagram of one embodiment of a system for providing a consistent user interface compatible with different CPDLC versions.

FIG. 1 is a block diagram of one embodiment of a system 100 for providing a consistent user interface compatible with different CPDLC versions. The system 100 enables communication between an aircraft 102 and an air traffic control (ATC) center 160. An avionics system 110 onboard the aircraft 102 comprises a control device 130, a human-machine interface (HMI) device 120, and at least one communication device 140. The components of the avionics system 110 are communicatively coupled to one another as needed using suitable interfaces and interconnects.

The control device 130 establishes and controls communications between the aircraft 102 and the ATC center 160 through context management application (CM) 135 and CPDLC functionality 160. The CM 135 is a data link application providing logon functionality that allows a CPDLC session to be established. The CPDLC functionality 150 includes CPDLC session functionality 152 and CPDLC version abstraction functionality 154. The CPDLC session functionality 152 provides the control device 130 with the ability to establish a CPDLC session with the ATC center 170 using context management logon information from the aircraft 102 to initiate the connection from the ground. The CPDLC version abstraction functionality 154 enables the HMI device 120 to present a consistent user interface regardless of the CPDLC version of the established CPDLC session. The control device 130 can be implemented as a communications management unit (CMU), a flight management computer (FMC), a communications management function (CMF), a flight management function (FMF), an electronic flight bag (EFB), or any other suitable computer or system. A control device (whether it is a CMU and/or an FMC) already existing in an avionics system can be updated with a firmware update to provide the CPDLC version abstraction functionality 154. The communication device 140 establishes a data link 170 between the aircraft 102 and the ATC center 160 through the CPDLC system 168. The data link 170 enables transmission and reception of various communications and data link messages.

The ATC center 160 comprises a CPDLC system 168 that supports CPDLC communications and a context management application 162. The CM application 162 provides addressing information used by the ground ATC center 160 to initiate establishment of a CPDLC session between the ATC center 160 and the aircraft 102.

The ATC center 160 can be implemented as a station configured for one of Very High Frequency (VHF) communications, High Frequency (HF) communications, or Satellite Communications (SATCOM) (or other appropriate communication technology known to one of skill in the art) for communication between the ATC center 160 and the aircraft 102. The communication device 140 in the onboard avionics system 110 is implemented so as to support the communication technology used by the ATC center 160. In addition, in some embodiments of the system 100, more than one communication device 140 and more than one ATC center 160 are used. For example, in some such embodiments, each communication device 140 and corresponding ATC center 160 are implemented so as to use a separate communication technology.

A user (such as a pilot or other crew member) logs onto the ATC 160 via the context management application 135 using the HMI device 120. A CPDLC session provides for the direct exchange of messages between the ATC center 160 and the aircraft 102. The CPDLC version abstraction functionality 154 enables the user to communicate electronically with the ATC center 160 via CPDLC through the HMI device 120 regardless of which CPDLC version the ATC center 160 supports and provides a consistent user interface between the various CPDLC versions. The user interface (UI) guides the user through a series of logical screen configurations or displays (referred to herein as screens or pages) that present logical objects. These objects are part of a user interface and comprise, for example, UI elements either elicit flight information from the user or notify the user regarding flight information and include information fields and control objects such as logical buttons. The HMI device 120 is typically a console device installed in the cockpit of the aircraft 102. Examples of the HMI device 120 include a Multi-Control Display Unit (MCDU) and a Multi Function Display (MFD) system.

Figure 2:
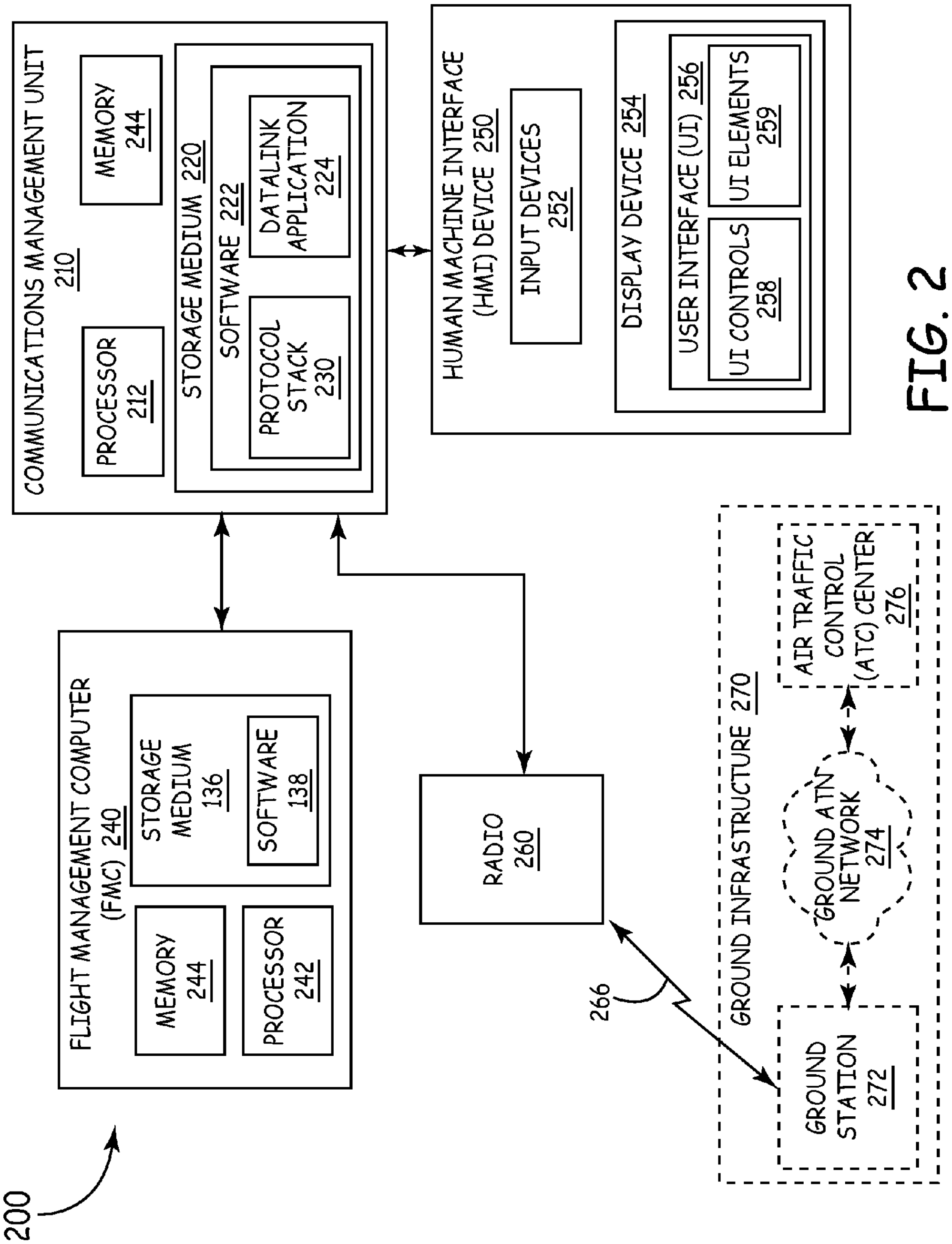
FIG. 2 is a block diagram of one embodiment of an avionics system.

FIG. 2 is a block diagram of one embodiment of an avionics system 200. The avionics system 200 provides a CPDLC data link 266 and a consistent user interface 256 that supports multiple Controller/Pilot Data Link Communications (CPDLC) versions. A communications management unit (CMU) 210 establishes the CPDLC data link 266 to a ground infrastructure 270. In addition to the CMU 210, the avionics system 200 comprises a flight management computer (FMC) 240, a human machine interface (HMI) 250, and at least one radio 260. The avionics system 200 provides a flight crew with access to CPDLC or Protected Mode Controller/Pilot Data Link Communications (PM-CPDLC). In the embodiment of FIG. 2, the CPDLC is hosted in the CMU 210; however in other embodiments, the CPDLC is hosted in an FMC, an FMF, a CMF, an MFD, or the like.

In the embodiment shown in FIG. 2, the ground infrastructure 270 includes a ground station 272 communicatively coupled to an air traffic control (ATC) center 276 via a ground aeronautical telecommunications network (ATN) 274. The ground station 272 receives and sends CPDLC messages to the avionics system 200 via the ATC center 276. In other embodiments, the avionics system 200 establishes a CPDLC session directly with the ATC center 276.

The CMU 210 comprises a memory 214, a protocol stack 230 and a data link application 224 stored in software 222 and executable by a processor 212. The protocol stack 230 provides access to an Aeronautical Telecommunication Network (ATN) and is used to establish the CPDLC data link 266. For example, the CMU 210 can include the ATN stack and Aircraft Communications Addressing and Reporting System (ACARS) stack.

The software 222 comprises program instructions that are stored or otherwise embodied on or in a suitable non-transitory storage device or medium 220. The storage medium 220 on or in which the program instructions are embodied is also referred to here as a "program product". The software 222 is operable, when executed by the processor 212, to cause the CMU 210 (and more generally the aircraft in which the CMU 210 is deployed) to carry out various functions described here as being performed by the CMU 210 (for example, at least a portion of the processing described below in connection with FIG. 3). Embodiments of the data link application 224 include a context management application or other suitable data link application. The CM data link application 224 provides logon functionality in support of CPDLC that allows a CPDLC session to be established as initiated by the ground ATC center 276. The CPDLC session enables an ATC controller and a crew member to communicate via electronic messages delivered through the Aeronautical Telecommunication Network (ATN). The data link application 224 may be part of a larger flight information/control program or may serve as a standalone program.

The FMC 240 comprises storage medium 246 containing software 248, a processor 242, and a memory 244. The FMC 240 performs functions related to controlling the flight of an aircraft. In another embodiment of the avionics system 100, the data link application 224 is implemented in the software 248. In an embodiment where the CM and CPDLC datalink application 224 is hosted in the FMC 240, the CMU 210 routes data link messages to and from the FMC 240 via a data bus, such as for example, an ARINC 429 bus. In such an embodiment, the HMI device 250 communicates with the FMC 240 directly (for example, via an ARINC 429 databus).

The radio 260 is communicatively coupled to the CMU 210. The radio 260 sends and receives messages between the avionics system 200 and a ground station 280 via the data link 266. The radio 260 supports any type of appropriate communication technology such as HF, VHF, or SATCOM. The FMC 240 sends or receives messages through the CMU 210 which communicates via the radio 260.

The HMI device 250 comprises a display device 254 and an input device 252. The input device 252 comprises any suitable peripheral device that enables a user to interact with an application, such as a keyboard, a curser control, a touch screen overlay panel, or the like. The display device 254 can include any device or group of devices for presenting visual information, such as a liquid crystal display (LCD), plasma monitor, cathode ray tube (CRT), or the like. The display device 254 displays the user interface 256 to a user which enables the user to logon to the ATC center 276 and select messages for uplink and downlink by manipulating the input device 252. The user interface 256 displays logical screens that comprises user interface controls 258 and user interface elements 259. The UI controls 258 comprise selectable object such as logical buttons, physical buttons, or combinations thereof. The UI elements 259 comprise objects such as information fields. The user interface 256 provides a consistent look and feel for the screens regardless of CPDLC version. In other words, the format and layout of the screens are similar across different CPDLC versions. This eliminates the need for a unique display device or screen format for each CPDLC version and the need for a pilot to be trained for each of those formats and CPDLC versions. In other words, the user interface 256 is capable of supporting a plurality of available CPDLC versions.

Each CPDLC version is a standard that describes what messages are supported by the ATC center 276 that uses that CPDLC version. A CPDLC version defines which messages out of a larger message pool the CPDLC version supports, as well defining the form a message can take. In other words, a CPDLC version defines a supported message set. The message sets contain predetermined messages that convey flight information such as reports or clearance requests. Some messages are for uplink and other messages are for downlink. As used herein, the term "uplink" refers to messages received by the avionics system 200 from the ATC center 276 (that is, messages going up to the aircraft) and the term "downlink" refers to messages sent from the avionics system 200 to the ATC center 276 (that is, messages going down to the ground).

One exemplary CPDLC version is the Link 2000 standard used in Europe, available from the European Organization for the Safety of Air Navigation. Link 2000 has a message set that has a limited number of messages that European ATC centers can exchange with aircraft flying in their airspace. However, another airspace may implement a different CPDLC version that supports a different message set. Also, new CPDLC versions may be developed through adding different messages from the message pool to previous CPDLC versions, adding new messages that were not previously in the message pool, or modifying the messages in a previous CPDLC version. For example, based on a recommendation of the Radio Technical Commission for Aeronautics (RTCA) sub-committee 214, the Federal Aviation Administration (FAA) is considering supporting a different CPDLC version that expands upon and modifies Link 2000.

Thus, a crew member of an aircraft flying from a first airspace supporting a first CPDLC version into a new airspace supporting a second CPDLC version may become confused about which messages are supported in each airspace. The consistent user interface 256 seamlessly updates what messages are available for the crew member to select based on the CPDLC version, thus reducing the likelihood of potential confusion.

Therefore, the user interface 256 enables a crew member to quickly find the same or similar downlink messages, log onto ATC centers supporting different CPDLC versions in the same manner, and understand what messages are and are not supported in the particular airspace. The user interface 256 presents message elements from different CPDLC versions in a consistent manner and indicates when a feature is unsupported by one CPDLC version or the other. A flight crew is prevented from selecting unsupported messages by removing the selection prompt for unsupported messages, graying out or changing the color of a particular field (for example, a faded color), graying out or changing the color of a related entry or selection box, removing the item from display (while retaining a placeholder or not), or any other suitable mechanism to indicate a feature is not supported. For similar messages with only minor differences, the same screen can be used but the differences between the CPDLC versions are hidden, shown with grayed out items, or by another mechanism to hide the fact that the message elements are different.

For example, a CPDLC version 1 supports altitude request only using units of flight level and a version 2 supports altitude requests using units of flight level (with units of hundreds of feet) and single feet. Because the avionics system 100 is compatible with both CPDLC versions, a request screen on the user interface 256 includes flight level and feet as options. When the avionics system 200 is communicating with a ground system that supports CPDLC version 2, the pilot selects either flight level or feet. When the avionics system 200 is communicating with a ground system that supports CPDLC version 1, only flight level is available for selection while feet would be "grayed" out.

Figure 3:
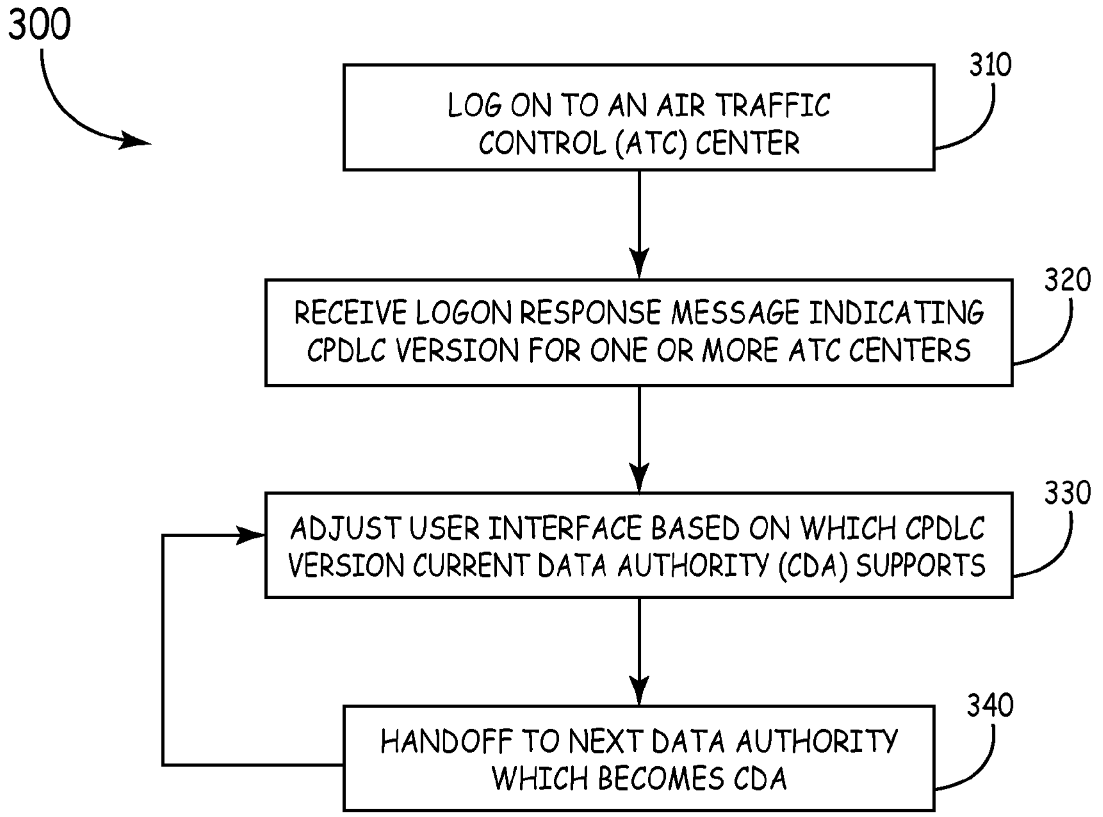
FIG. 3 is one embodiment of a method of providing a consistent user interface for a CPDLC data link.

FIG. 3 is one embodiment of a method 300 of providing a consistent user interface for a CPDLC data link. Because the user interface is consistent between different CPDLC versions, the flight crew can easily get the correct messages for downlink into any supported CPDLC version. This reduces confusion due to differences in the appearance and functionality of the logon screens and downlink screens (or pages) for the different CPDLC versions. The method 300 begins with logging onto an ATC center 276 using a data link application such as a context management (CM) application (block 310). The human machine interface 250 presents a user (for example, a pilot) with access to a logon page or set of logon pages. The logon pages retain the same form regardless of the version CPDLC being logged into. The user enters information into the logon page such as origin and destination of the flight, flight number, ATN address for the aircraft, and other flight information. The user can also select which ATC center to log into (for example, from a pull down menu of available ATC centers). In one embodiment of logging onto the ATC center 276 comprises first logging onto the ground station 272, comprising a ground logon system, and then routing the communications to the ATC center 276.

Once the logon page is completed, the user instructs the CMU 210 (for example, by selecting a send button) to send a logon message comprising the information entered into the logon page to be sent. One embodiment of the logon message indicates what CPDLC versions the CMU 210 supports. The logon message could also contain information regarding the support of other applications. The logon message can also indicate that it supports a second CPDLC version but that the CMU 210 can drop back to a first CPDLC version. The logon message is received by the ATC center 276 and is used to establish a CPDLC session.

Upon a successful logon, the CMU 210 receives a logon response from the ATC center 276 indicating the CPDLC versions supported by one or more ATC centers (block 320). For example, the CPDLC version the particular ATC centers supports, such as ATC center 276, is included in the logon response. In other words, the ATC center 276 that receives the logon message has a peer CM (or other suitable application) that sends a logon response indicating which CPDLC version the ATC center 276 supports and potentially which CPDLC versions other ATC centers support. The HMI 250 can provide an indication to the flight crew as to the CPDLC version of the current CPDLC session based on feedback from the CMU 210 indicating the current CPDLC session's CPDLC version. The ATC center 160 that the aircraft 102 is connected to and currently communicating with at any given time is referred to as the current data authority (CDA). Once logged on, the ground has information to establish CPDLC sessions with the aircraft 102. The version number associated with the CDA CPDLC connection is determined based on the version number for that ATC center or airspace received in an earlier CM logon response. This session is based on the CPDLC version that the ATC center 276 supports. A message log can be provided to the HMI 250 that indicates when a message has been received so the flight crew is made aware of the new message.

The CMU 210 adjusts the user interface 256 based on which CPDLC version the CDA ATC center supports (block 330). These adjustments reduce the user's potential confusion between different CPDLC versions because only the messages supported by the CDA's CPDLC version will be available for selection. Thus, the user will not have to make a determination of which messages correspond to the CPDLC version the CMU 210 is connected to because the CPDLC version abstraction functionality 154 has provided instructions to the user interface 256 to adapt it to the CDA's CPDLC version. This reduces the possibility of the user sending an unsupported message. The adjustments can include updating which messages are available for sending to the ground based on the CDA's CPDLC version, indicating that messages are not supported (for example, by graying out, changing the color of, or not displaying unsupported messages), providing an indication of the CPDLC version, and the like.

As the aircraft continues on its flight path, the current data authority (CDA) can handoff the connection to a second data authority, for example, a next data authority (NDA) (block 340). The NDA is typically another ATC center along the aircraft's flight path, and after the handoff, the NDA becomes the CDA. A logon response from the ground indicates to the CMU 210 what CPDLC versions are supported in various ATC centers. In another embodiment, information related to the CPDLC versions of various ATC centers is uplinked from the CDA or any of the ATC centers in a separate message. In another embodiment, information relating to the CPDLC versions that a list of ATC centers support is stored in a storage medium onboard the aircraft.

When the aircraft is within range of the NDA, the CDA directs the aircraft to hand off to the NDA by ending the CDA connection. The CMU 210 seamlessly transitions onto the NDA connection to become the CDA connection without having to restart the data link application 224. The CMU 210 seamlessly transitions to the NDA to become the new CDA by updating the display device 254 to display the old NDA ATC center as the CDA ATC center (that is, the new CDA) while still displaying CPDLC version of the new CDA (old NDA). The user interface is adjusted based on the new current data authority. When the aircraft changes airspaces, the supported CPDLC version may also change. If the new CDA (old NDA) supports a different CPDLC version than the CPDLC version the previous CDA ATC center supported, the CMU 210 changes the CPDLC version to the version the new CDA (old NDA) supports. Through the handoff and automatic version update, the flight crew does not need to take action, change its approach when it send messages, or even know which CPDLC version it is logged into. In some implementations of the method 300, an additional logon is required to get additional logon information to and from ATC centers in order to establish a CPDLC session with a new ATC center and determine the CPDLC version if not already known from a prior logon.

Embodiments of the method 300 are also performed by peer applications in the ATC center 276. That is, peer applications and hardware (such as a ground human machine interface device) in the ATC center 276 support multiple CPDLC versions. The ATC center 276 establishes a CPDLC session of a first CPDLC version with a first aircraft. The ground human machine interface device displays logical screens based on the first CPDLC version, as described above with respect to the human machine interface device 250. If the first CPDLC version changes to a second CPDLC version (for example, by connecting to an aircraft with a CPDLC version preference for the second CPDLC version), the ground human machine interface device is adjusted based on the second CPDLC version. Any of the features and functions described herein with respect to the system 100 and the avionics system 200 can be implemented in the ATC center 276 or in another part of the ground station 270.

Figure 4:
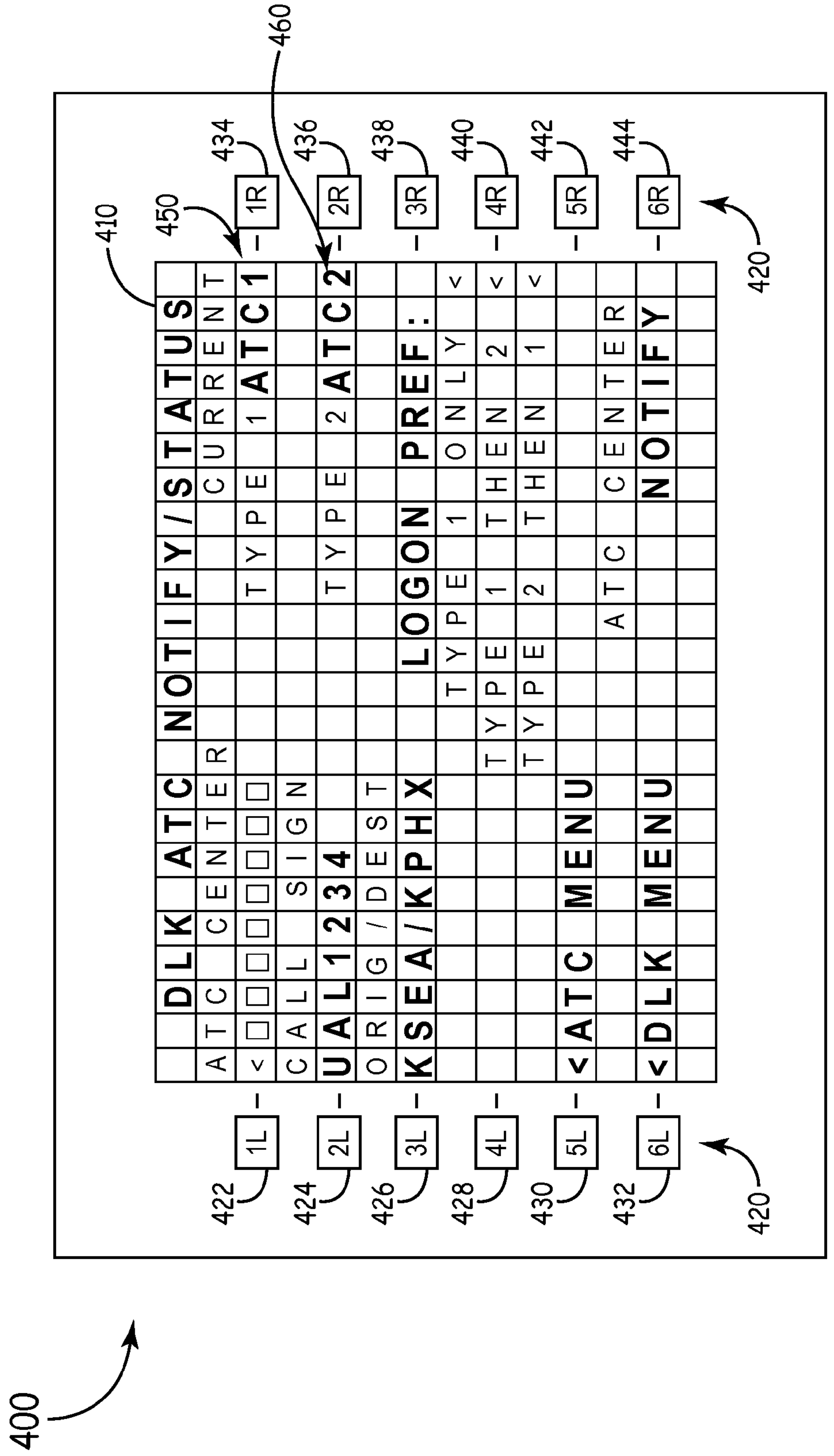
FIG. 4 is one embodiment of a display device displaying a user interface.

FIG. 4 depicts one embodiment of a display device 254 displaying a user interface 400. In this embodiment, the user interface 400 is displaying an exemplary logon page 410. The login page 410 has the same form regardless of which CPDLC version it is used to log into. The user interface 400 includes a plurality of physical buttons 420 or other appropriate input devices 252, such as a keyboard or keypad. The user interface 400 is part of a console human machine interface, such as HMI device 250. Each button 420 of the user interface 400 can be associated with a particular onscreen selection. If there are more buttons 420 than screen selections, some buttons 420 will be inoperable. A selection can be made by the user by pushing the appropriate button 420. For example, as shown on the user interface 400 showing the exemplary logon page 410, a button 430 is associated with a selection "ATC menu" that brings the user to an ATC page that lists available ATCs and a button 432 is associated with a selection "DLK menu" that brings the user to a downlink page menu. One exemplary embodiment of a downlink page comprises a screen that lists messages that can be selected for sending to ground based on the CPDLC version of the current CPDLC session. Other embodiments of the user interface 400 provide logical user interface controls 258 that can be manipulated by a user. For example, logical buttons are displayed on the user interface 400 that can be selected by the user, for example with a mouse or by pressing a corresponding area of a touch screen.

The exemplary logon screen 410 shows two ATCs and which CPDLC versions the ATCs support. The two CPDLC versions are depicted as "type 1" and "type 2." The current data authority, ATC1 450, supports CPDLC version 1. The next data authority, ATC2 460, supports CPDLC version 2. The user is given an option to indicate preference of what CPDLC version to use. In this example, three options for preferences are presented: first, to prefer CPDLC version 1 only; second, to prefer CPDLC version 1 over CPDLC version 2; and third, to prefer CPDLC version 2 over CPDLC version 1. In the first option, the logon will use CPDLC version 1 only. In the second option, the logon will attempt CPDLC version 1, and if rejected, will try CPDLC version 2. If the third choice is made, the logon will try CPDLC version 2, and the ground may select either CPDLC version 2 (preferred) or CPDLC version 1 in the logon response. In one embodiment, if the ATC does not support one CPDLC version or the other, the avionics system 200 can automatically reconsider using the other CPDLC version. In the embodiment shown in FIG. 4, the user selects one of these options by pressing button 438, which toggles through the three options. In one embodiment, the currently selected choice is indicated, for example, by an asterisk in proximity to the selection.

Having a consistent user interface 256 regardless of CPDLC version will reduce pilot error and workload when operating with two or more different message sets on an ATN CPDLC application. This gives the flight crew one look and feel to the logical screens yet guides them into making the proper data entries for the particular CPDLC version of the message set being used in the airspace where they are currently flying. The flight crew can be trained on the single system and can transition between different CPDLC versions without any surprise or confusion. The consistent user interface 256 makes the flight crew's interactions with the ground more straightforward. Only a single HMI device 250 is needed to support multiple CPDLC versions instead of requiring a HMI device 250 for each CPDLC version.

The user interface 256 provides a consistent logon page and downlink page even when the messages between multiple CPDLC versions are different and cannot be mapped to each other. The CMU 210 is also capable of supporting different CPDLC versions that have large disparities between their message format and the size and complexity of their message sets. Which options the user interface 256 presents to a user is based on the CPDLC version number received by the ATC center 276 in the logon response.

The processors 212 and 246 discussed above can be implemented using software, firmware, hardware, or any appropriate combination thereof, as known to one of skill in the art. By way of example and not limitation, hardware components for the processors 212 and 246 can include one or more microprocessors, memory elements, digital signal processing (DSP) elements, interface cards, and other standard components known in the art. Any of the foregoing may be supplemented by, or incorporated in, specially-designed application-specific integrated circuits (ASICs) or field programmable gate arrays (FPGAs). In this exemplary embodiment, the processors 212 and 246 includes or functions with software programs, firmware, or other computer readable instructions for carrying out various process tasks, calculations, and control functions. These instructions are typically tangibly embodied on any appropriate medium used for storage of computer readable instructions or data structures.

The memories 214 and 244 can be implemented with any available computer readable storage media that can be accessed by a general purpose or special purpose computer or processor, or any programmable logic device. Suitable computer readable media may include storage or memory media such as magnetic or optical media. For example, storage or memory media may include conventional hard disks, Compact Disk—Read Only Memory (CD-ROM), Digital Video Discs (DVDs), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), and the like), Read Only Memory (ROM), Electrically Erasable Programmable ROM (EEPROM), flash memory, and the like. Suitable processor-readable media also include transmission media such as electrical, electromagnetic, or digital signals, conveyed via a communication medium such as a network and/or a wireless link. Combinations of the above are also included within the scope of computer readable media.

A number of embodiments of the invention defined by the following claims have been described. Nevertheless, it will be understood that various modifications to the described embodiments may be made without departing from the spirit and scope of the claimed invention. Features described with respect to one embodiment can be combined with, or substituted for, features described in other embodiments. Accordingly, other embodiments are within the scope of the following claims.

What is claimed is:

1. An avionics system comprising:
- a human machine interface configured to display a user interface; and
- a control device coupled to the human machine interface, wherein the control device is configured to:
  - send and receive controller/pilot data link communications (CPDLC) messages;
  - send a logon message to an air traffic control center;
  - receive a logon response message sent from the air traffic control center, the logon response message sent upon a successful logon to the air traffic control center in response to the logon message, the logon response message specifying a first CPDLC version that a current data authority supports; and
  - adjust the user interface based on the first CPDLC version specified in the logon response message.

2. The avionics system of claim 1, wherein the human machine interface further comprises:
- a display device for a displaying a logical screen corresponding to the user interface; and
- an input device configured to allow a user to interact with the user interface; and
- wherein the logical screen displays a user preference option for selecting a CPDLC version logon sequence preference from a plurality of CPDLC version login sequence preferences, and wherein the control device selects between sending a logon message for the first CPDLC version and sending a logon message for a second CPDLC version based on the CPDLC version logon sequence preference.

3. The avionics system of claim 2, wherein the logical screen comprises at least one of a logon page and a message selection page.

4. The avionics system of claim 3, wherein the at least one logon page further comprises an option for selecting an air traffic control center to log into from a plurality of available air traffic control centers.

5. The avionics system of claim 1, wherein the first CPDLC version further comprises a first CPDLC version of a first ground station to which the avionics system is logged into.

6. The avionics system of claim 1, wherein the control device is further configured to indicate that an unsupported message is not supported by the first CPDLC version.

7. The avionics system of claim 6, wherein the control device is configured to indicate that an unsupported message is not supported by the first CPDLC version and is further configured to one of remove a selection prompt for the unsupported message, gray out the unsupported message, fade the color of the unsupported message, change the color of the unsupported message, and remove the unsupported message from the page.

8. The avionics system of claim 1, wherein the display device is further configured to display an indication of the first CPDLC version.

9. The avionics system of claim 1, wherein the control device is further configured to:
- establish a second CPDLC session with a second ground station, wherein the second ground station supports a second CPDLC version; and
- adjust the one or more pages based on the second CPDLC version.

10. The avionics system of claim 1, wherein the control device is one of a flight management computer and a communication management unit.

11. A method of providing a user interface for a Controller/Pilot Data Link Communication (CPDLC), comprising:
- receiving a logon response message sent from an air traffic control center, the logon response message sent upon a successful logon to the air traffic control center in response to a logon message, the logon response message specifying that the current data authority supports a first CPDLC version; and
- adjusting an output of the user interface based on the first CPDLC version specified in the logon response message.

12. The method of claim 11, further comprising adjusting a ground station user interface based on the first CPDLC version.

13. The method of claim 11, further comprising:
- displaying a user preference option on the user interface for selecting a CPDLC version logon sequence preference from a plurality of CPDLC version login sequence preferences, and
- selecting between sending a logon message for the first CPDLC version and sending a logon message for a second CPDLC version based on the CPDLC version logon sequence preference.

14. The method of claim 13, further comprising:
- wherein the logon message contains an indication of a preferred CPDLC version; and
  - wherein a CPDLC session of the preferred CPDLC version is established when a connection is established with the current data authority that supports the preferred CPDLC version.

15. The method of claim 11, further comprising:
- determining a second CPDLC version of a second data authority;
- establishing a CPDLC session of the second CPDLC version with the second data authority; and
- adjusting the output of the display device based on the second CPDLC version.

16. The method of claim 11, wherein adjusting an output of the display device based on the second CPDLC version further comprises indicating that an unsupported message is not supported by the first CPDLC version.

17. The method of claim 16, wherein indicating that an unsupported message is not supported by the first CPDLC version further comprises one of removing a selection prompt for the unsupported message, graying out the unsupported message, fading the color of the unsupported message, changing the color of the unsupported message, and removing the unsupported message from the page.

18. A program product comprising a non-transitory processor-readable medium on which program instructions are embodied, wherein the program instructions are operable, when executed by at least one programmable processor, to cause the at least one programmable processor to:

determine a first Controller Pilot Data Link Communication (CPDLC) version from a logon response message received from a first air traffic control (ATC) center, the logon response message sent upon a successful logon to the air traffic control center in response to a logon message and including the first CPDLC version; and provide instructions to a human machine interface to display a first page where only messages supported by the first CPDLC version are selectable.

19. The program product of claim 18, wherein provide instructions to the human machine interface further comprises display an indication the first CPDLC version.

20. The program product of claim 18, further comprising:

determine a second CPDLC version of a second ATC center;

establish a CPDLC session of the second CPDLC version with the second ATC center; and provide instructions to the human machine interface to display a second page where only messages supported by the second CPDLC version are selectable.

* * * * *